(12) United States Patent
Cruickshank

(10) Patent No.: US 9,672,479 B2
(45) Date of Patent: *Jun. 6, 2017

(54) SYSTEM, METHOD AND APPARATUS FOR POWER MANAGEMENT

(76) Inventor: Robert F. Cruickshank, Big Indian, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,940

(22) Filed: Apr. 23, 2012

(65) Prior Publication Data

US 2012/0209438 A1    Aug. 16, 2012

Related U.S. Application Data

(63) Continuation of application No. 12/385,616, filed on Apr. 14, 2009, now Pat. No. 8,195,337.

(60) Provisional application No. 61/044,899, filed on Apr. 14, 2008.

(51) Int. Cl.
  *G05D 11/00*     (2006.01)
  *G06Q 10/00*    (2012.01)

(52) U.S. Cl.
  CPC .................................. *G06Q 10/00* (2013.01)

(58) Field of Classification Search
  USPC .......................................... 700/22, 286, 291
  See application file for complete search history.

(56) References Cited

U.S. PATENT DOCUMENTS

| | | | | |
|---|---|---|---|---|
| 5,818,725 A * | 10/1998 | McNamara et al. | ......... | 700/286 |
| 5,973,481 A * | 10/1999 | Thompson et al. | ............. | 322/7 |
| 6,512,966 B2 * | 1/2003 | Lof et al. | ...................... | 700/291 |
| 6,882,904 B1 * | 4/2005 | Petrie et al. | .................. | 700/295 |
| 7,181,517 B1 * | 2/2007 | lavergne et al. | .............. | 709/224 |
| 7,406,364 B2 * | 7/2008 | Andren et al. | ............... | 700/286 |
| 7,489,974 B2 * | 2/2009 | Numano | ......................... | 700/22 |
| 7,499,762 B2 * | 3/2009 | Khorramshahi | ............... | 700/22 |
| 7,580,732 B2 * | 8/2009 | Bailey | ......................... | 455/572 |
| 7,761,910 B2 * | 7/2010 | Ransom et al. | .................... | 726/6 |
| 2002/0005668 A1 * | 1/2002 | Couture | ......................... | 307/98 |
| 2002/0087234 A1 * | 7/2002 | Lof et al. | ..................... | 700/286 |
| 2002/0198629 A1 * | 12/2002 | Ellis | ............................ | 700/286 |
| 2003/0158677 A1 * | 8/2003 | Swarztrauber et al. | ........ | 702/62 |
| 2004/0138981 A1 * | 7/2004 | Ehlers et al. | ................... | 705/36 |
| 2004/0162642 A1 * | 8/2004 | Gasper et al. | ................ | 700/286 |
| 2005/0043858 A1 * | 2/2005 | Gelman et al. | .............. | 700/286 |
| 2005/0055137 A1 * | 3/2005 | Andren et al. | ................ | 700/291 |
| 2005/0137813 A1 * | 6/2005 | Swarztrauber et al. | ........ | 702/62 |
| 2005/0144437 A1 * | 6/2005 | Ransom et al. | .............. | 713/151 |
| 2006/0036350 A1 * | 2/2006 | Bohrer | .................. | F24F 11/006 |
| | | | | 700/276 |
| 2006/0122738 A1 * | 6/2006 | Yamada et al. | ............... | 700/295 |
| 2006/0238364 A1 * | 10/2006 | Keefe et al. | .................. | 340/646 |
| 2006/0259199 A1 * | 11/2006 | Gjerde et al. | ................ | 700/284 |
| 2006/0259254 A1 * | 11/2006 | Swarztrauber et al. | ........ | 702/64 |
| 2007/0038414 A1 * | 2/2007 | Rasmussen et al. | ............. | 703/1 |
| 2007/0043477 A1 * | 2/2007 | Ehlers et al. | ................. | 700/276 |

(Continued)

*Primary Examiner* — Ryan Jarrett
(74) *Attorney, Agent, or Firm* — The Mueller Law Office, P.C.

(57) ABSTRACT

A system, method and apparatus provide management of power to meet demand of consumers that consume the power. An interface is configured to receive a pricing signal that indicates a price for the power. Wherein the interface is configured to control an appliance coupled to the interface to shift adjusting power consumption sooner in time than the appliance is predetermined to shift its power consumption.

16 Claims, 9 Drawing Sheets

(56) References Cited

U.S. PATENT DOCUMENTS

2007/0226290 A1* 9/2007 Khorramshahi ............. 709/201
2008/0040263 A1* 2/2008 Pollack et al. ................. 705/39
2009/0099801 A9* 4/2009 Swarztrauber et al. ........ 702/64

* cited by examiner

SYSTEM, METHOD AND APPARATUS FOR POWER MANAGEMENT

PRIORITY

This application is a continuation of U.S. patent application Ser. No. 12/385,616 filed on Apr. 14, 2009 and entitled "Method & Apparatus For Orchestrating Utility Power Supply & Demand In Real Time Using A Continuous Pricing Signal Sent Via A Network To Home Networks & Smart Appliances", which claims priority from U.S. Provisional Application No. 61/044,899, filed Apr. 14, 2008 , all subject matter and drawings of which are incorporated fully herein by reference.

BACKGROUND

Heretofore it was not possible to implement flexible pricing to adequately match demand to supply because there was not available a Network Infrastructure connected at the appliance level. The Internet, is but one example, of a Network which is connected to a sufficient number of homes and, more and more, to smart appliances.

Of the 1.7 billion homes in the world approximately 270 million or 16% currently have broadband Internet service. And some areas of the world are very highly penetrated by broadband. For example, in the United States nearly 60% of the homes have broadband and in Europe nearly 30%. These numbers are on the rise as evidenced by world-wide Cable Modem penetration growing from 21% from the third quarter of 2005 to the third quarter of 2006.

Wide-area wireless penetration is growing even faster. There is no stopping this trend. Much of our world, our laptops, PDAs and iPods are hooked up to the Internet, and before long our home appliances will be on the 'Net, too. However, although we take the Internet for granted today, it was only very recently in the history of energy supply that the Internet has become available and, even more recently, available to the power resource management market.

Regarding power resource management, a long standing problem arises from the fact that traditional fossil-fuelled electrical capacity operates less of the time, albeit quite efficiently. Those power sources are simply incapable of providing on demand power that draws more power than a baseline amount. They are slow to ramp up and typically are complex in operation.

On the other hand, other types of power sources, such as renewable electrical capacity, e.g., wind and solar power, can be more efficiently put to immediate use right when it becomes available. Typically, these power generators can be ramped up and on line relatively quickly and are not as complex to operate. Unfortunately, renewable energy resources are not available 24/7 like traditional fossil fuel resources are made to be.

Nonetheless, renewable energy sources that do not pump environmentally harmful emissions into the atmosphere are of high interest in these times of reports of melting polar caps and biblical scale weather disasters. Problematically, one cannot simply cause the sun to shine or the wind to blow. Hence, the world is caught in a damaging cycle of reliance on fossil fuel energy sources that contribute to global warming because only these sources are able to meet immediate large aggregate demand for power.

In addition to the problems of global warming and providing on demand power, there is a need for a system that protects the power supply infrastructure. The new millennium was supposed to herald in a new era of humanity and enlightenment, instead it was witness to continent wide blackouts due to mismanagement of power infrastructure and poor contingency planning However, simply blocking off failed power grids may not be enough of a solution. As witnessed with the power failures of the American Northeast, subsequent power grids were insufficient to manage the surge in demand and too shut themselves down. One after the other, each power grid shut itself down in a domino like effect that crippled the entire eastern seaboard of the continental United States. All because of improper power resource management.

Rerouting power is not a sufficient answer alone. For example, rerouting power only affects the end of the supply chain and ignores any front end problems of power supply. It does nothing to eliminate the problem of a break in the supply of the fuel used in power generators. A power utility simply does not manage an oil pipeline break, for example, in its day to day operations.

Most solutions in the art are supply side oriented, since this side is easier to manipulate traditionally. More recently, solutions have experimented with demand side control to affect power supply issues. In the past, some have suggested curtailing peak demand, typically once per day. However, these suggestions only considered demand on an overall level. The instant solution seeks not to control either side, but to orchestrates both supply and demand, and vice versa.

Another problem of these older suggestions is that do not consider the effects on everyday people of modest means. For example, using the peak shifting technique, the entire market is shifted regardless of usage. For industry, this means a chance to save significant cost over the course of a year. However, those of modest means or budget would be discouraged to use appliances to, for example, take a hot shower or cook meals, even though adequate supply of power was available. In other words, the user of modest means or budget is unfairly dissuaded out of the market by larger energy consumers.

For another thing, none of the prior solutions consider demand in the aggregate on a per appliance type. By lumping demand as one large ball of wax, the solutions of yesterday were prejudicially skewed toward large demand users. By targeting appliances, on the other hand, the instant invention is able to pin point demand and match it to supply in the most accurate and methodical manner.

What is needed is a power control system that is able to meet fluctuations in the aggregate demand in real time and on demand. A system is needed that not only takes into account supply side or demand side, but orchestrates both supply and demand of power. Such a control system should put power generators to maximum efficiency and integrate renewable energy sources in order to reduce environmentally unfriendly emissions and stem the tide of global warming. It should also take into account the everyday needs of home users and target demand at the per appliance type level. In addition the preferred control system should serve to protect power infrastructure and reroute demand around failed grids and, for that matter, take into account breaks in fuel supply chains.

SUMMARY OF THE INVENTION

The present invention represents a true breakthrough over previous solutions in that it provides a real means to orchestrate supply and demand, not simply trying to manage power resources by manipulation of either side of the demand/supply equation. The exemplary control system causes power generators to operate at maximum efficiency and integrate renewable energy sources in order to reduce environmentally unfriendly emissions and stem the tide of global warming. The invention also takes into account the everyday needs of home users and targets demand at the per appliance type level. In addition the preferred control system protects power infrastructure and reroutes demand around failed grids and, for that matter, takes into account breaks in fuel supply chains.

The invention in one implementation encourages or discourages use directly at the user site, i.e., the home. As will be seen from the examples set forth herein, this has a direct effect on utility generation and distribution. Heretofore, the means for orchestrating supply and demand have been virtually unrealizable.

In one implementation, the invention utilizes a Network such as the Internet to orchestrate supply and demand, or vice versa, at the user site. Broadband Internet provides a persistent 'always on' Internet Protocol (IP) connection between homes and Electric, Gas and Water Utilities. This persistent IP connection allows fluctuations on the SUPPLY-SIDE, for example from wind or solar power, to be accommodated on the DEMAND-SIDE by using thermal storage in hot water heaters and refrigerators as well as by deferring (or encouraging) discretionary loads such as dishwashers, clothes washers, clothes dryers, swimming pool pumps, etc. In short, a variable energy pricing signal will be continually or semi-continually broadcast in REAL-TIME through the Internet and in-home Networks in search of smart appliances to encourage or discourage use (demand) in the home.

The examples herein also encompass using weather forecasts, not just to decide when to bring a fossil-fuel generator off-line for maintenance, but in addition thereto (or in combination therewith) to schedule energy usage during periods of high and low energy production from wind and sunshine. With at least one implementation of the examples described herein, usage of power can be scheduled when the wind is blowing or the sun is shining taking into account predictable regional weather patterns.

In another implementation, pent up demand can be created and in so doing forestalling the spinning up and bringing online of 'swing' or peak generation facilities. Thereafter, the facilities are brought online, and when they are, demand is ramped up quickly so that the generator quickly approaches near its maximum output. In other words, the generator is brought up to its greatest, or maximum, efficiency within a short period of time when it is brought on line.

In another implementation, a base line generator that provides a base line of power is kept at a constant output. This reduces costly maintenance and rebuilding due to increased wear and tear during generator warm-up and/or cool-down. Typically, these are the traditional fossil fuel power generators that are complex and require long ramp up periods. Providing these power resources as steady state power resources is sensible for the first 10-20% of power demand.

The invention in yet another implementation considers the needs of the everyday consumer and balances the playing field. One manner in which the invention performs this feat is by considering demand on a per appliance type level, thus avoiding the false methodology currently used of lumping demand (both large and small) together.

Looking at one more possible implementation, there is the real-time ability to protect and/or stabilize electric, gas and water distribution Networks when transmission circuits, or pipelines, fail or become overloaded. In this implementation, the invention redirects demand away from faulty networks or energy sources that have become log jammed toward supply resources that are available or will become available in the next few to ten minutes.

The invention can also be utilized to store pent up demand in terms of thermal storage by inducing those of thermal storage appliances to maintain their thermal capacity for later use. Similarly, the invention can cause home owners to use that personal pent up thermal storage for their own use. Examples of thermal storage devices include hot water boilers and, more recently, electric cars. In this manner, the invention also lends itself to integrated power supply management that effectively allows home owners to become power resources.

In an additional implementation the invention also provides modes of operation of the appliances based on pricing levels, for example, expensive or inexpensive, and shifts operating boundary conditions up or downward by means of a pricing signal.

In the examples provided herein, supply and demand of power are discussed in terms of electrical power, though similar opportunities exist and the examples may easily replace traditional source of electrical power using other sources of power including power from water & natural gas utilities, especially in transmission and distribution. The examples described herein are not exhaustive of the invention and other examples are within the scope of this description. It will be appreciated that the implementations of the examples are multiple and that these implementations, which are described in more detail, are simply a selection of the many possible implementations.

BRIEF DESCRIPTION OF THE DRAWINGS

FIG. 9b shows a portion of the duty cycle schedule of FIG. 9a;

DETAILED DESCRIPTION OF THE PREFERRED EMBODIMENTS

Figure 1:
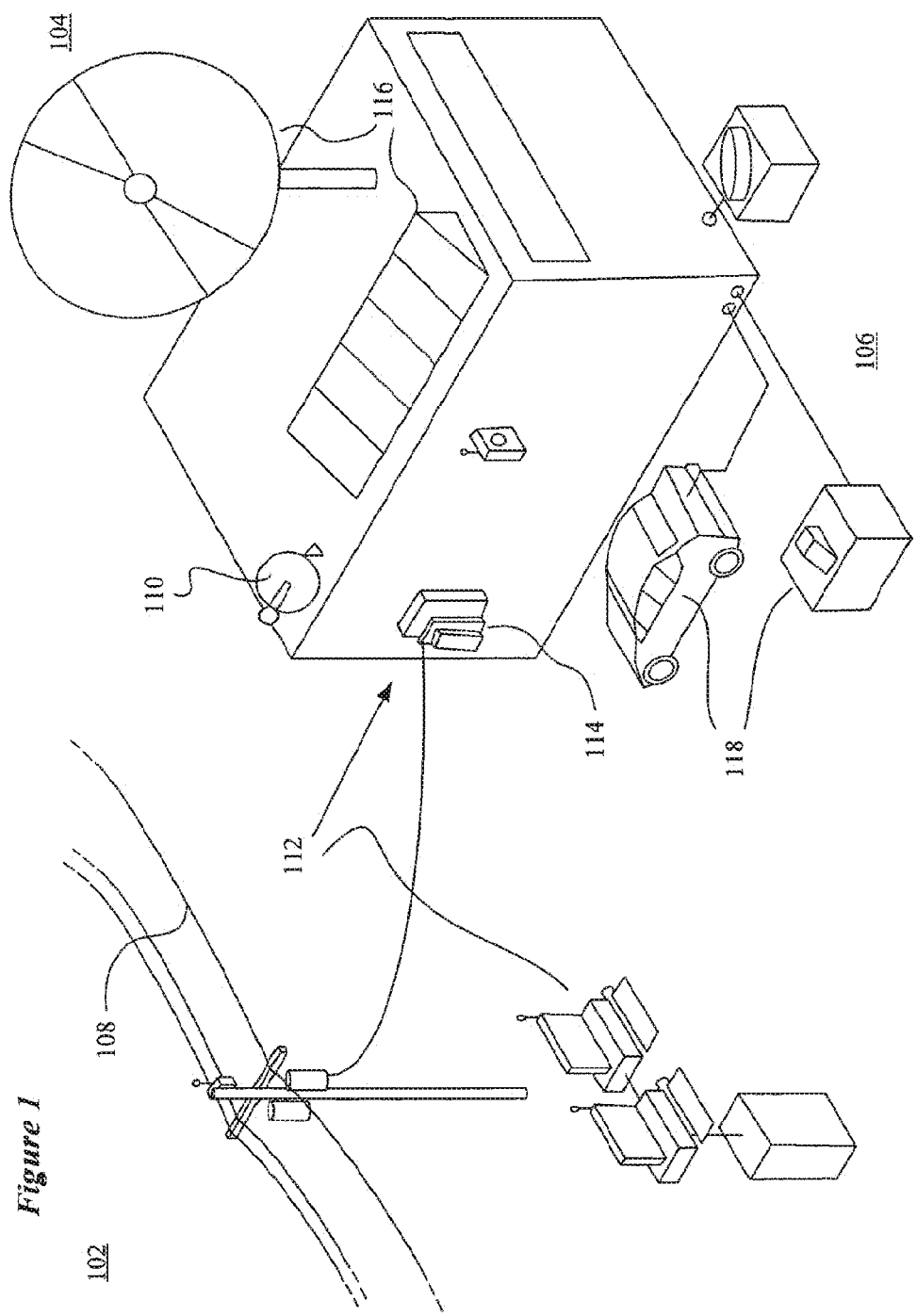
FIG. 1 illustrates an exemplary system that encompasses the present invention.

Before turning to a more detailed description of the invention, the present invention is illustrated as being embodied in a Network 102 as shown in FIG. 1. The Network may be the Internet and may be, for example, connected to the users in any suitable manner, such as by way of traditional broadband, satellite, WiLan, cable or utility power lines. In the present invention a real-time pricing signal is continuously transmitted over the Network 102 over a predetermined period of time. The Network may be connected to homes 104 and/or smart appliances 106 and power generators and/or power generator utilities.

As shown in FIG. 1, the supply side may be connected to the demand side via a consumer portal and building EMS 106, through utility communications channels 108 or via satellite 110. There further may be control interfaces 112 or advanced metering systems 114 that are used to assist in the orchestration of the supply/demand relationship by, for example, controlling local appliance or reporting metering information. In addition, the power generators may include solar or wind mills 116 and the smart appliances may be smart end-user devices, plug in hybrid cars or distributed generation storage systems 118, for example.

It shall be appreciated that one skilled in the art will know how to instruct a processor of a smart appliance in order to turn on or off the respective appliance in response to a pricing signal. For that matter, it is well within the capability of the skilled person to implement the invention in terms of software to be executed, wholly or in part, by a computer and store the instructions therefore on a computer readable medium.

Now a discussion of the mechanics of the invention will ensue by first considering the Supply-Side of the power equation. Thereafter, a discussion of concrete example will be set forth to describe the invention in full detail.

Importantly, Supply Side generation of electricity is responsible for approximately ⅓ to ½ of primary energy consumption. For example, of all the energy consumed in New York State in 2005, 38% was used for the generation of electricity. In other words, the type of power generators for the electrical power is a predictable quantity and the invention aims at resourcing these generators. Although, it should be clear at this point that the invention also is applicable to any type of power source.

According to one implementation, for example, the invention increases efficiency of electrical generation by placing the demand right where the supply of power is at its optimal efficiency output. This reduces overall fuel consumption, forestalls building of new power plants, and/or has a positive impact on reducing greenhouse gases. The details of this effect of the invention will be described in more detail with references to the exemplary models below.

Figure 2:
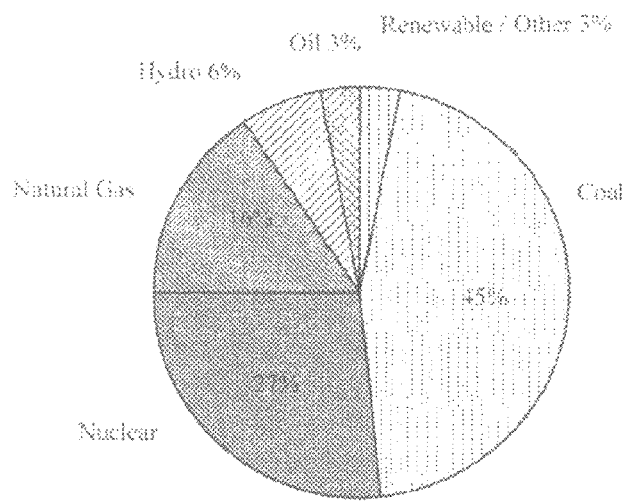
FIG. 2 illustrates United States Electrical Energy Production Supply-Side Statistics.

The invention in another implementation puts to use renewable energy sources. Observing FIG. 2, which shows United States Electrical Energy Production 'Supply-Side' Statistics, it can be plainly seen that renewable energy contributes a relatively small amount of the power supply sources in the United States as compared with traditional power. By contrast, wind power is responsible for nearly 30% of the total Danish demand for electricity and approximately 16% of Germany's demand. To put this in perspective, wind power alone covers the aggregate demand of 1.4 million Danish homes, or in other words, the entire energy demand of western Denmark.

Regrettably, the U.S. has a culture of on demand power supply, which is hard to fulfill by application of renewable energy sources. However, the fault is not all due to lifestyle but also on the conditions suitable for tapping into these renewable energy sources. Wind and solar are temperamental and are not always available around the clock. While it is true that Holland and Denmark have a culture of energy conservation, these countries are also blessed with regions of high wind.

In addition, the infrastructure for renewable energy resources in the U.S. is not yet fully manifested. Smaller countries like Holland and Denmark have been able to accomplish more because they have the luxury of having a smaller country to deal with. For the same reasons, many European countries (particularly those in eastern Europe) have been able to update their power grids to address modern ideals and available technologies. For all that, the U.S. may be in a unique position to benefit from the instant invention. Given the size and mixed variety of power infrastructures in the U.S., there is a very real need for orchestration of the supply of power to the demand for that powering America.

While the U.S. has lagged behind European countries in the renewable energy sector, the possibilities of wind power in the U.S. are demonstrable. The state of Texas, for example, has significant wind power production and is the largest producer of wind energy in the United States. Thus, the capability is there. There only needs the means by which these resources can be adequately put to use in the U.S.

The present invention seeks, in at least one implementation, to capitalize on these renewable energy resources and put them to efficient use in the overall power supply matrix. The present invention orchestrates these pockets of renewable energy and integrates them into the mainstream infrastructure. As the U.S. embraces renewable energy more and more, as it undoubtedly will, the solution provided herein is scalable and will be there to orchestrate these resources as well.

Figure 3:
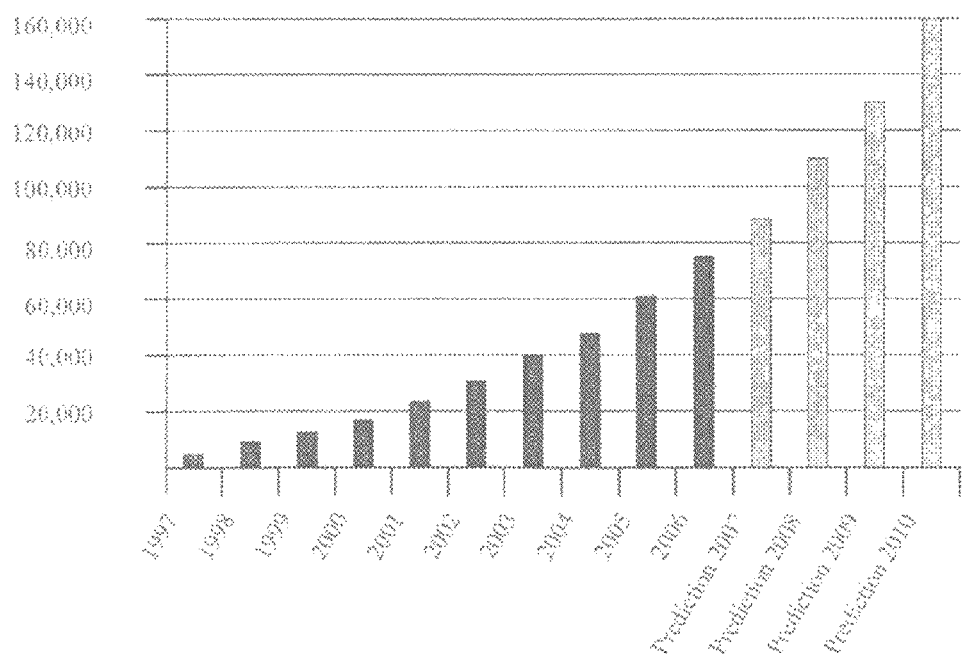
FIG. 3 illustrates storage capacity on the DEMAND-SIDE.

As can be seen from FIG. 3, which shows Total Stored Capacity in MW, wind power production in the U.S. is expected to more than double in the next four years. Now is the time for a realizable integration of these renewable energy resources. The present invention timely provides this integration by orchestrating the supply and demand, and vice versa.

While efforts to foster increased production from renewable resources such as wind and solar are much needed and welcome, there is a growing problem of how to search for uses of (demands for) renewable energy right at the time when it becomes available. For example, if it is particularly windy while people are sleeping, there is an immediate supply of power, but there may not be as high a demand for that power as compared to during daylight hours.

As a result, countries such as Denmark have reached an upper limit and have begun or soon will limit production of renewable energy. Even the countries which have incorporated renewable energy sources into their infrastructure, there is still a need for the present invention to orchestrate those resources. The present invention does not simply catalyze the bringing on line of renewable resources, it orchestrates them and brings them into the infrastructure in such a way that they are utilized at their maximum efficiency. Thus, countries like Denmark will also benefit from use of the invention.

The question is then, how can renewable energy be provided on demand when weather is a temperamental variable? One could imagine that the energy from a renewable resource could be stored, such as in a battery. While the invention is workable with storage elements, a battery solution alone does not sufficiently address the problem of providing the demand for power right at the time when the power is readily available.

For one thing, using batteries to store the power disconnects the causal link between the generators supplying power and the demand of that power. Thus, a battery cannot dictate how long a generator should be on line to meet a certain amount of demand. Nor can a battery maximize the efficiency of the output of a particular generator based on the demand. For that matter, the battery cannot predict what total amount of power will be needed and will likely fall short of adequately matching that demand to the renewable supply. Because the causal connection between supply of power and its usage is disconnected, a battery system by itself is unable to match demand or power with supply of power as described herein. What is needed in addition is the present invention.

Thus far, the mechanics of supply and demand have been discussed in the overall power scheme. Now continuing on, the mechanics of the building blocks by which the invention orchestrates that supply and demand will now be discussed.

In one implementation of the invention, there is employed a Network, such as an IP Network 102 shown in FIG. 1, to orchestrate the supply and demand of power. For one thing, the invention uses the Network to send a pricing signal in real-time to homes or appliances. In this manner, the invention communicates an availability (i.e., in terms of price) of SUPPLY-SIDE power generation capacity. As will be explained below, the invention further changes the price so that the DEMAND-SIDE for the power can utilize generation resources in the most fuel efficient and environmentally friendly ways. As will further be explained, the invention indicates a price (or prices for various or combine power supply sources) that has the effect of shifting the demand to a time when resources are available or brought on line. The invention, thus, provides the demand in sufficient quantity to match an efficiency of a particular generator or combination of generators.

Figure 4:
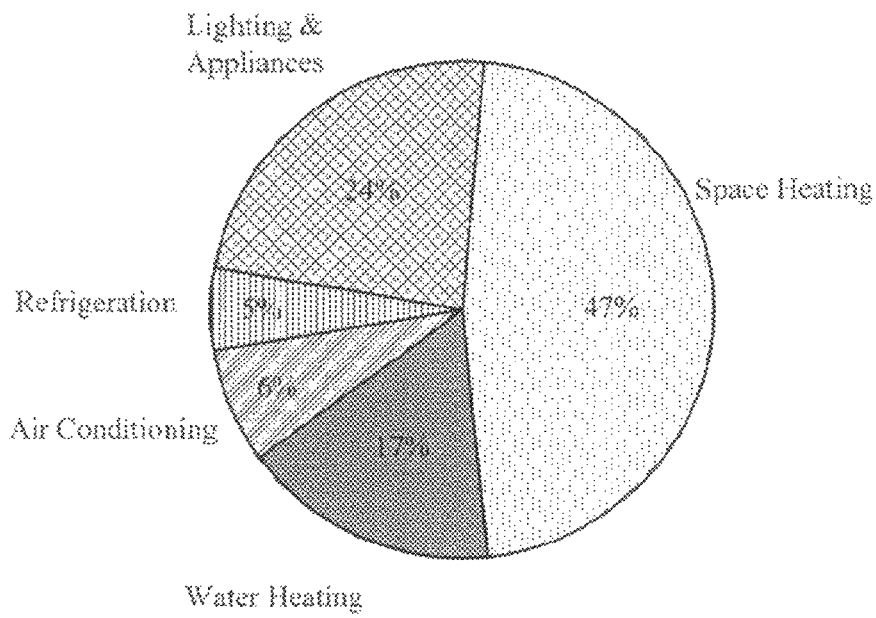
FIG. 4 illustrates various uses of energy in the home.

To estimate the variable storage capacity on the DEMAND-SIDE, attention is directed to the various uses of energy in the home as shown in FIG. 4. Some energy uses in the home such as lighting are required based on what users are doing (herein referred to as activity dependant appliances or uses) others are not. The present invention takes advantage of that distinction in one implementation by encouraging or deferring demand of power by user activity "independent" appliances, such as water heating and/or refrigeration appliances. Of course, to some degree appliances such as hot water boilers and refrigerators are dependant on the user activity, however, less so than lighting appliances, and exhibit a certain amount of independence from the activity. These appliances tend to have a thermal storage capacity that allow them to provide energy on demand locally without demanding, or delay the demand, of power from an external source, such as a power plant.

Another feature to notice is that the independent activity appliances are more predictable over a certain period of time. In one implementation, the present invention can model uses based on independent activity appliances that illustrates this predictability for an aggregate number of appliances. That is not to say that the invention cannot create mappings of activity dependant appliances, in fact the invention is applicable to those appliances as well, given only the restraints of finding some commonality of behaviour of those appliances. For example, people tend to use lighting during the day as opposed to night time when they are asleep.

In addition, the present invention operates at sufficiently frequent intervals to encourage or discourage demand. This has a significant positive impact on electrical demand without compromising the needs of users. For example, in one implementation, the invention schedules efficient generation for pre-cooling or pre-heating of living spaces, to cool millions of homes in southern climates before the occupants return on a summer evening, or heat homes in northern climates in anticipation of the workforce returning home.

The methods presented here are a significant break away from the prior work on load shifting and load curtailment. Peak shaving, for example, reduces the amount of electricity purchased for some period of time. Sometimes this is accomplished by curtailment (shutting down loads), sometimes by load shifting (thermal storage) and sometimes by self-generation. Much of this previous work has focused on shifting peak demand into the traditional diurnal valley so that a flatter demand curve results in lower requirements (and costs) for peak generation facilities.

Peak shifting could be achieved by creating a high pricing signal once a day during peak. In this peak-shifting scenario, every day at the same time peak pricing goes into effect which discourages usage. Problematically, those users who can afford to pay peak pricing can choose to use as much as they want when they want, and may choose not to participate in load management at all.

While a more expensive price of energy might help curtail demand by users during peak, a scenario that is not resolved is the impact on the less-fortunate and budget conscious users. A terrible negative effect of traditional peak pricing is that poor people simply cannot afford to use energy during peak. Waiting until 2:00 AM for the dishwasher to automatically start is a good thing, but would waiting until 2:00 AM when the price of energy is low enough to, say, cook dinner, is not a feasible solution for the entire power demand market.

A solution proposed by this invention to the problems encountered by load shifting is to change the price of energy to encourage or discourage use many (many) times throughout the day, for example as many as 8-10 times, in predictable ways. An implementation of the invention varies pricing enough so that demand is responsive, in other words that demand in the aggregate is incentivized to change its behaviour owing to pricing.

In the same implementation, the invention may also consider the needs and budgets of the consumers whilst varying pricing in a demand responsive way. As mentioned already, providing various pricing changes throughout the day offers users of modest means to obtain the power they require at a time that is not inconvenient or would otherwise dramatically task that user's stored energy waiting for pricing to drift downward. By making demand responsive to pricing, for example, by setting pricing to levels attainable by those of modest means or budget, the present invention does not simply cut off all demand as in peak shifting.

With reference to FIGS. 5-10, concrete examples of how the invention orchestrates, that is coordinates, SUPPLY-SIDE power resources and DEMAND-SIDE power needs will be described.

Figure 5:
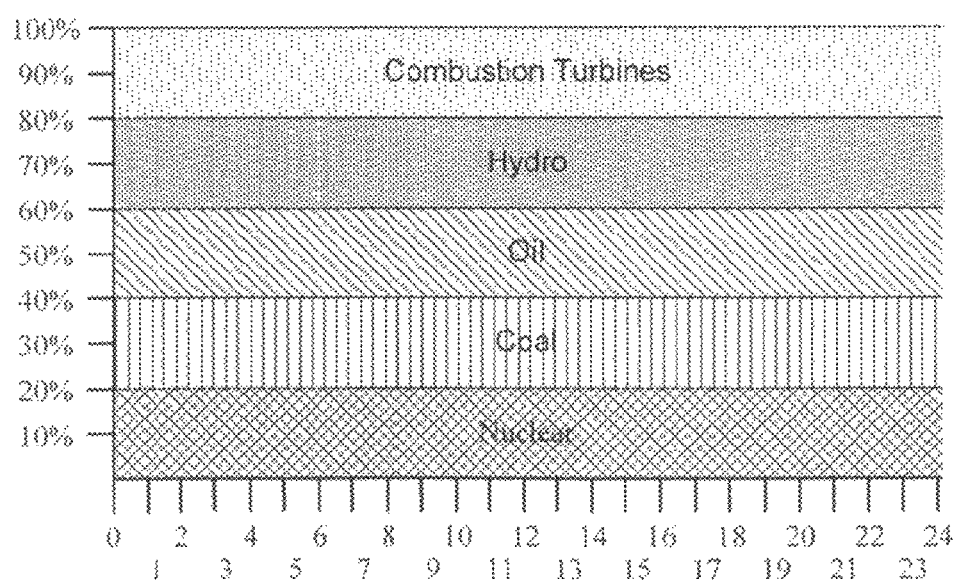
FIG. 5 illustrates a model of generation supply capacity.

FIG. 5 illustrates a model of generation supply capacity over a predetermined period of time, here 24 hours. In the figure each horizontal band is one or more 'chunks' of supply capacity. This model is somewhat simplified in that each of the types of power source, including combustion turbines, hydro electric energy, oil, coal and nuclear are illustrated in an arbitrary order. Although, it could be observed that FIG. 5 generally illustrates power sources that are arranged diagrammatically in order of ramp up time. For example, it is seen from the figure that the power sources, such as nuclear generators, which are less flexible and require a relatively long and complicated power up procedure, are arranged as base lines of energy, here shown as 20% of the initial overall power needs or demand. These resources might account for user activity dependent demand, or on demand, such as lighting which requires an immediate supply of power when the user switches the light on and off throughout the day.

On the other end of the power generator spectrum, we see more flexible generators that can meet on demand power needs arranged along the higher demand requirements as can be seen from FIG. 4. For example, hydro, combustion turbines, and/or spot market power generators represent power sources that may be brought online more quickly and with a relatively less complicated ramp up procedure. These more flexible resources may, as suggested by the figure, provide power for the remaining 60%-100% of the aggregate demand. This demand may be, for example, power requirements for user activity independent appliances or uses, such as refrigerators and hot water boilers.

Figure 6:
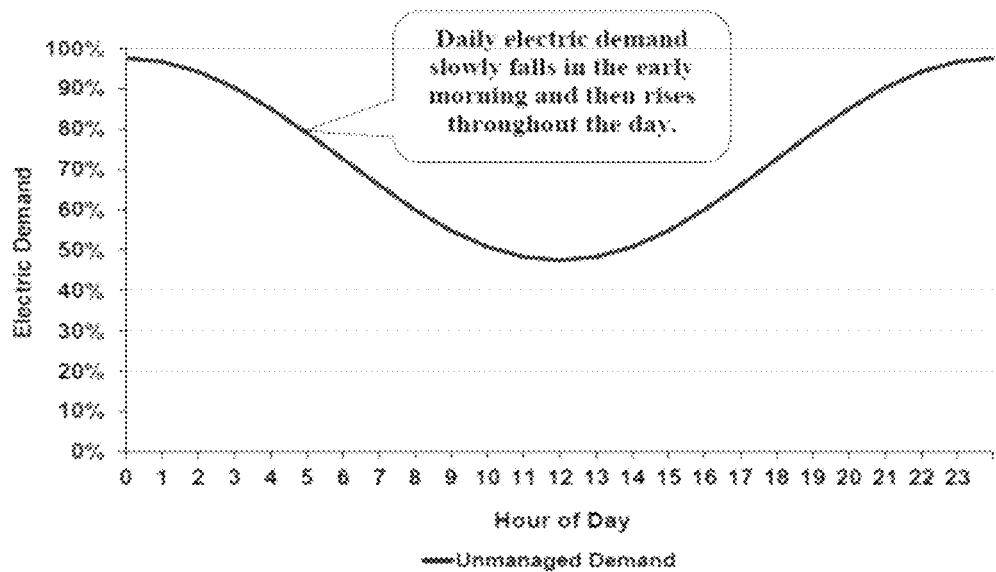
FIG. 6 illustrates a model of aggregate electrical demand.

Now turning to the demand side of the equation, consider the simplified model of aggregate electrical demand shown, for example, by FIG. 6. The curve in FIG. 6 may be the demand curve experienced by a winter peaking utility over a predetermined period of time, such as 24 hours. Here it could be observed that the curve corresponds to one that is in a northern climate given the high electrical demand for space heating in the night hours. When night gives way to day, daily electric demand slowly falls in the morning and then rises steadily.

Figure 7:
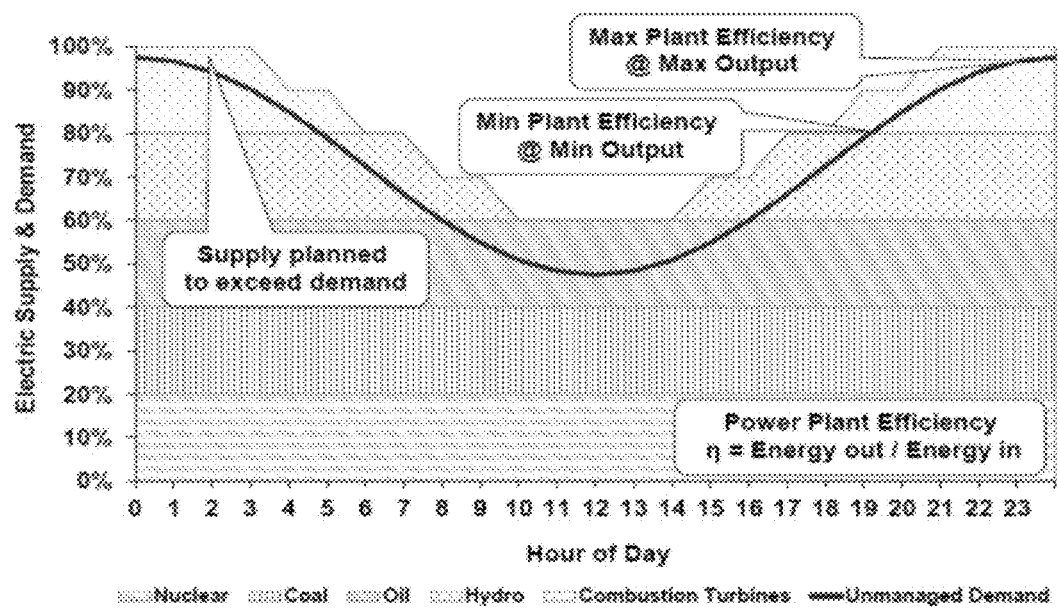
FIG. 7 illustrates FIGS. 5 and 6 superimposed.

The invention maps, or superimposes, the simplified supply and demand of power models in FIGS. 5 and 6, to obtain FIG. 7. FIG. 7 illustrates how the supply side operates throughout a predetermined period of time, here a 24 hour day, in order to meet the aggregate energy demand across large serving areas. The 'stair steps' in FIG. 7 correspond to generators being brought on-line and off-line (i.e., starting up and shutting down) throughout the day as aggregate demand rises and falls. Steady state operation is illustrated where the lines are flat. It is to be noted that the highest output shown here is not necessarily the maximum output of the generator.

It shall be appreciated that, for a particular power generator, a minimum efficiency of use occurs at point 702 when there is no demand for the power output. Conversely, at point 704, the demand almost matches the output of the power generator and yields a maximum efficiency of use as given by the equation efficiency=energy output/energy. One of the driving principles behind the present invention is to place or shift the aggregate demand right at the point where a generator is available to output at its maximum efficiency.

It is to be appreciated that a certain amount of power, known in the industry as spinning reserve, is in practice in excess of instantaneous demand. Of course, there are times when the output will overstep the spinning reserve upper ceiling. The spinning reserve provides capacity to meet unexpected demands and cover for generation or distribution failures. The spinning reserve is diagrammatically illustrated in FIG. 7 at point 706 and, further, by the way the demand curve does not follow the boundary of the step curve.

The aggregate demand curve shown in FIGS. 6 and 7 is predictable. In other words, the aggregate demand curve rises and falls with regularity from day to day, or over a certain time period. The curve may be said to have a Markovian-like behavior. In other words, demand in the aggregate will generally be similar to the previous day. There may be exceptions caused by intervening events such as inconsistent weather, particularly, temperature swings that affect heating and cooling demands, weekdays versus weekend days, holidays, etc.

In general, however, if the event is consistent from time period to time period a Markovian like demand curve can be developed that is useful for prediction of future demand according to the present invention. For example, heat waves that last a number of days will affect the aggregate demand for a new, but predictable, demand curve. A region that receives sporadic rainfall could also have some predictable nature to its region's demand curves. The invention matches this future predictability to supply resources.

A Markov process is defined as a stochastic process whose state at time t is X(t), for t>0, and whose history of states is given by x(s) for times s<t is a Markov process if:

$$Pr[X(t+h)=y|X(s)=x(s), \forall s \leq t] = Pr[X(t+h)=y|X(t)=x(t)], \forall h > 0 \quad \text{Equation 1.}$$

That is, the probability of its having state y at time t+h, conditioned on having the particular state x(t) at time t, is equal to the conditional probability of its having that same state y but conditioned on its value for all previous times before t.

Markov processes are typically termed (time–) homogeneous if $$Pr[X(t+h)=y|X(t)=x] = Pr[X(h)=y|X(0)=x], \forall t,h > 0 \quad \text{Equation 2.}$$

As mentioned above, the time period illustrated in the Figures is merely representative and any time period can be selected. For example, given a particular weather pattern, it will make sense to select a time period that is either shorter or longer than a day. As long as the time period supports a pattern of predictable demand, the invention can operate to predict demand for future periods of time.

To continue, the present invention takes advantage of the predictability of demand in the aggregate. As can be seen from FIGS. 5-8, the present invention maps an aggregate demand curve within a period of time that is sufficient to demonstrate a predictability. By moving or shifting the demand for power according to the present invention, the supply side output can be more closely tracked, as illustrated by the steps formed in the shifted demand curve shown in FIG. 8. In other words, supply capacity of the power plants is more efficiently utilized.

In the context of FIG. 1, a real time pricing signal is issued over the Network 102 to homes 104 and/or to appliances such as hot water heaters, refrigerators and other appliances 106. As will be further described, the various appliances have a typical duty cycle schedule that describes the energy consumption of the particular appliance in terms of duty timing and firing rate. Based in part on the duty cycle schedule and the pricing signal, which is issued continuously over a period of time, it is decided whether or not to delay firing of the particular device.

Figure 8:
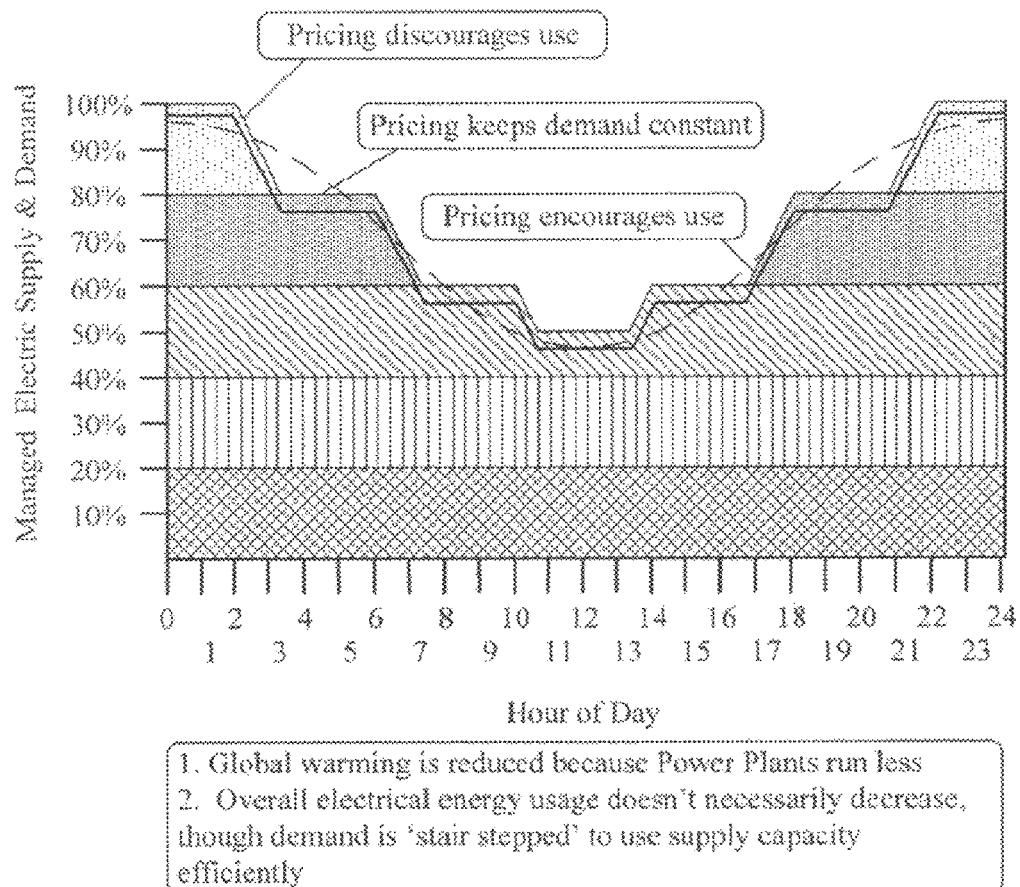
FIG. 8 illustrates how the present invention more closely matches demand to supply.

In the aggregate, these appliances in the cause demand which is shifted to a time when there is an optimal amount of power being output, possibly from a combination of power sources. In this manner, aggregate demand can be much more controlled. The demand 'follows' (or accommodates) the stair-stepped SUPLY-SIDE capacity as shown in FIG. 8 thereby matching demand to supply, not vice versa. It shall be appreciated that this arrangement is contrary to conventional supply chasing demand.

As already mentioned, an amount of spinning reserve must also be taken into account. The present invention, in one or more implementations, adjusts for the spinning reserve by matching aggregated demand to maximum plant efficiency less the spinning reserve as shown in FIG. 7. Matching of the aggregate demand will be discussed in more detail. Suffice to say at this stage that the point at which it is chosen to shift the demand is when the respective power generator is outputting power at the optimal quantity offsetting for spinning reserve.

It will be appreciated that the precise amount of spinning reserve is a predetermined parameter that is specific to the particular power generator and will only be discussed as a variable herein without specific reference to the ratings of any particular generator. That these ratings are specific to the various utilities, which can be easily attained therefrom.

In FIG. 8 the overall energy usage (i.e., the integral or area under the curve) is similar to that shown FIG. 7. While the pricing signal might or might not discourage overall usage in a 24 hour day, it definitely does discourage and encourage energy use at several times throughout the day. This is done to forestall bringing generating capacity online and then once brought online to move said capacity to its maximum output and efficiency as quickly as possible.

The duration of time that a facility might be forestalled in coming online might be any period of time. In the meantime another power generator might be selected to meet more immediate need. Thus, the invention can provide a delay that is deminimus to most power uses, such as a few to tens of minutes. This is done because too long a delay in meeting demand would unnecessarily burden users of modest income or budget because they would have to wait unreasonably long to, say, cook dinner or take a shower. As the more complex power generators come online, the invention can shift demand to those generators to meet additional demand not met by the more flexible generators.

The ability to delay the start of such a facility and then within minutes to bring it to near its maximum output clearly has a significant fuel environmental savings. Certainly some types of generators can come on-line and off-line more quickly than others, gas turbines being the most agile and perhaps nuclear plants being the least. And as previously stated there must be sufficient spinning reserve at all times. Bringing these on line on when the demand is aggregated enough to match a maximum efficiency of one or more power generators, avoids both wasting energy keeping power generators online but idle or operating the power generators at lower efficiencies.

In other words, by way of the present invention, less energy overall is needed to meet the power demands of users because less energy is wasted. That means in a very real sense, energy is conserved and less global warming emissions are created, thereby helping to slow the global warming problem.

Now that the mechanics of the invention have been described in sufficient detail, we now turn to specifics that will be described with reference to FIG. 9*a*.

Figure 9A:
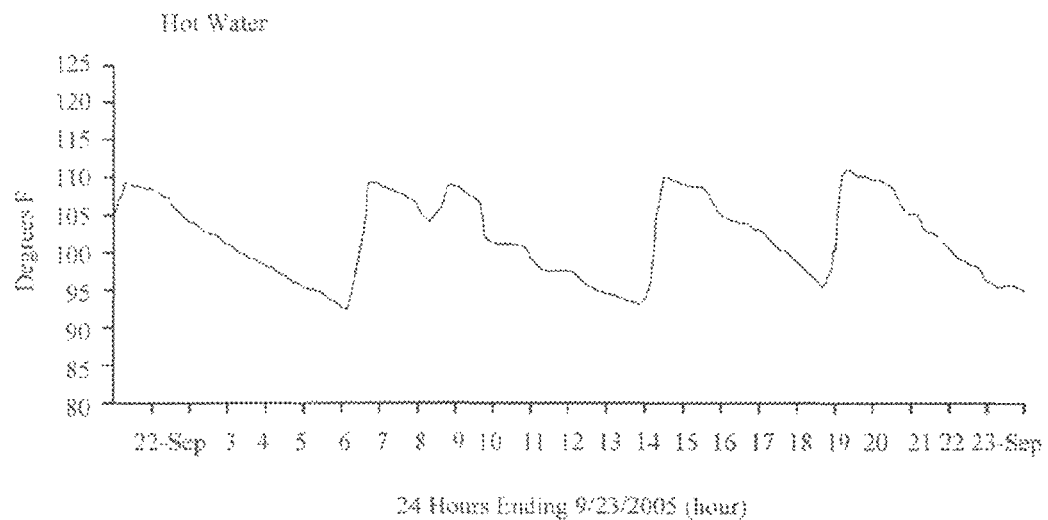
FIG. 9a illustrates a duty cycle schedule of a typical hot water heater.

FIG. 9*a* illustrates a duty cycle schedule of a typical hot water heater. In another sense, FIG. 9*a* may also be considered to illustrate the energy storage capability of demand-side appliances. To be certain, a hot water heater consumes power. However, that very same heater at any time typically is holding and maintaining thermal energy. In that sense, the aggregate of a number of such hot water heaters could be considered as a sort of energy source, itself a power generator.

While hot water heaters cannot be used as a source of power, they can be thought of as storing energy. In this sense, how much energy a particular hot water heater has left can be used to determine when the hot water heater should fire in comparison to a pricing signal. When, for example, the hot water heater has sufficient energy to provide a hot shower, for example, at a time when showers are expected to be demanded according to the duty cycle schedule, there may be a decision to delay firing for a few minutes with no real change in performance output. In other words, the user experiences a hot shower without ever knowing that the hot water boiler firing timing was delayed. The delay in demand of power is transparent to the end user.

Turning now to a more specific discussion of the hot water boiler modeled by FIG. 9*a*, there is seen, starting at the left side, a decline in water temperature from an upper limit of approximately 110° down to 95° over the period from near midnight to approximately 6:00 AM. The relatively constant slope of the temperature line over this period indicates that no water has been drawn from the tank. At 6:00 AM the water heater fires for a short duration to bring the output temperature back up from its lower limit, and fires again around 8:00 AM to accommodate the demand for hot water being drawn from the tank. Perhaps someone took a shower or did some laundry and/or dishes. Of course, this duty cycle schedule is merely indicative of the power consumption of a typical hot water heater, and any other duty cycle schedule might be replaced with the one shown in FIG. 9*a*.

Figure 9B:
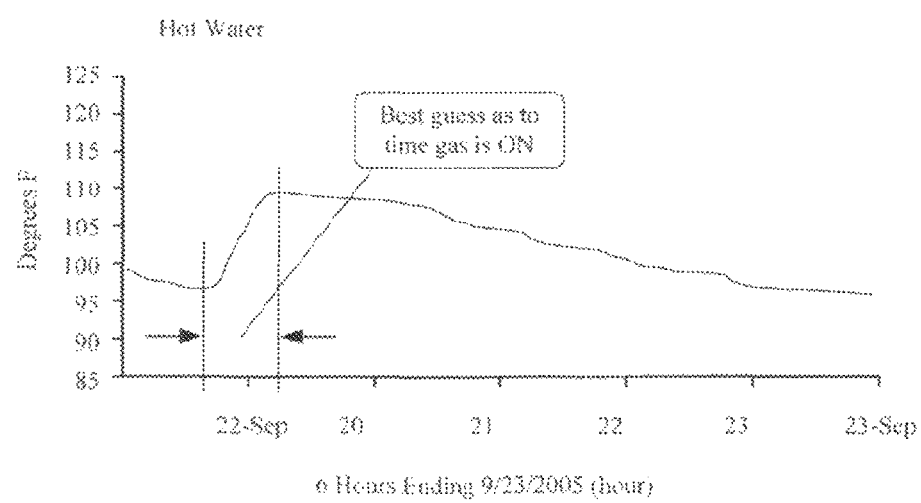

Continuing with the example, FIG. 9*b* shows a portion of the duty cycle schedule of FIG. 9*a* in more granularity over a six hour period. From this figure, it can be seen that the firing cycle (assuming here that hot water is not being drawn) is approximately 30 minutes in duration. Again, FIGS. 9*a* and 9*b* are mere examples and any other firing timing could be substituted for that shown.

Referencing FIGS. 9*a* and *b*, it can be estimated that the duty cycle of the residential hot water heater in standby mode (where it assumed that no hot water is being drawn) is approximately 30 minutes every 6 hours=~8%. Accounting for additional firings during periods of hot water usage results in an estimated hot water heater duty cycle of ~10% over a 24 hour day. Said another way, at any given point in time, 1 in 10 hot water heaters will be firing.

Considering there are approximately 110 Million homes in the United States, roughly 11 million hot water heaters are firing around the clock, with even more expected to be firing before the morning rush hour and after the evening rush hour. When one considers the enormous impact that shifting demand has, one then understands the great potential for the present invention to both save costs for everyone concerned and help to save the environment at the same time.

The invention tends to have an affect on demand in the aggregate, although the invention could also be used for less than an aggregate of appliances. In addition, the aggregate may represent a specific type of appliances or, more likely, a combination of types of appliances.

It shall be noticed that the present invention is directed to aggregating demand on the appliance level, in contrast say to total demand from a user, ie, by reading meter data of that user. In that regard, the invention understands a picture of how appliances react over a course of time and, depending on their type, can price them out of the market for a specific period of time. In other words, the invention shifts demand on the appliance level, as opposed to the user level. Of course, the invention can affect a combination of types of appliances, however, it does so by determining the demand on an appliance type.

In one implementation Aggregate of demand is calculated according to Equation 3. For example, if ⅓ of the 11 million hot water heaters in the U.S. are electrically fired, then at least 3.7 million electric hot water heaters can be managed at any given point in time. Given that the typical electric hot water heater has a 4.5 kW demand when firing, the aggregate electrical demand of heating hot water is 16.5 GW (Gigawatts) as indicated in Equation 1. This is a large amount of demand, representing approximately 22% of the 73.9 GW of worldwide electrical supply from wind power at the end of 2006.

$$\Sigma Appliances(type) \times \% \text{ Duty Cycle} \times \% \text{ Electric Fired} \times Wattage = Aggregate\ Demand \quad \text{Equation 3.}$$

In terms of our instant example, the total aggregate demand for water heaters is the number of water heaters× percentage appliance duty cycle (10%)×percentage firing timing (33%)×Wattage or, $$\Sigma \text{Water Heaters} \times 10\% \text{ Duty Cycle} \times 33\% \text{ Electric Fired} \times 4.5 \text{ kW} = 16.5 \text{GW}$$

In our example, the present invention determines a typical duty cycle schedule over a period of time that is sufficiently long to provide a predictable demand curve such as the one shown in FIG. 9a. In this example, the duty cycle schedule is modelled for hot water heaters, but any type of appliance may similarly be modelled.

Thus far, an aggregate demand is calculated from the duty cycle schedule along with other parameters, such as the total number of appliances belonging to the demand group and firing timing over the period of interest. The aggregate demand, which may be for one or more types of appliances, is then compared, or mapped onto, such as shown in FIG. 7, with the a power supply-side curve. And it is determined then if a suitable supply of power is available from any of the power generators, or if, for example, power generators need to be brought online. If power generators need to be brought on-line, it is also determined how fast the particular generator or generators need to be brought up to maximum efficiency from the supply side curves of FIG. 5 or 7.

As earlier mentioned, the generators that need to be brought on line may be renewable energy power sources such as, for example, wind power generators. These wind power generators also have a known typical operation time, i.e., when wind typically is blowing in a particular region, and a model such as that shown in FIG. 6 is developed. The demand would then be shifted then to the time when the wind power generators are in operation, i.e., when the wind is blowing.

In continuing with our example, the pricing signal is modified to discourage demand until such time that the supply side is able to match the demand. In one implementation, it does so until the supply side is operating at maximum, or optimal, efficiency.

In another implementation, the pricing signal may discourage demand for a few to tens of minutes as mentioned above in order to give people of modest means a chance to utilize the power at convenient times, i.e., rather than having to wait hours to cook dinner or take a shower, for example. In our hot water boiler example, users do not have to wait to take a hot shower.

In still another implementation, the invention selects the time period according to the thermal storage capacity of a particular type of appliance or appliances. In regards to the hot water boiler example, there already may be sufficient hot water in the boiler for a shower such that the delay of demand, i.e., switching the hot water boiler on is unnoticeable to the end user.

In yet another implementation, the demand for power is discouraged because of infrastructure failures and is represented in the form of the supply side curve showing a lack of ability to presently provide power. Those generators that can be brought online automatically will be by operation of the present invention and will be distributed the demand, i.e., rather than the defunct or out of commission power generators. Indeed, the present invention in this implementation will shift demand away from defunct power sources.

The present invention, in yet another implementation, uses modes of operation to control aggregate demand by automatically adjusting the real-time price transmitted to end uses such as appliances that can start and stop at will based on the default set of user preferences. When electricity is inexpensive, heater will come on early and stay on longer. For example, a dishwasher may not choose to wait until after midnight when energy is less expensive. When energy is more expensive, on the other hand, a hot water heater may not choose to run until after its internal temperature has fallen some number of degrees below its normal 'start' temperature. Likewise an a hot water heater that is already running may choose to stop before reaching it's normal 'stop' temperature.

Figure 9C:
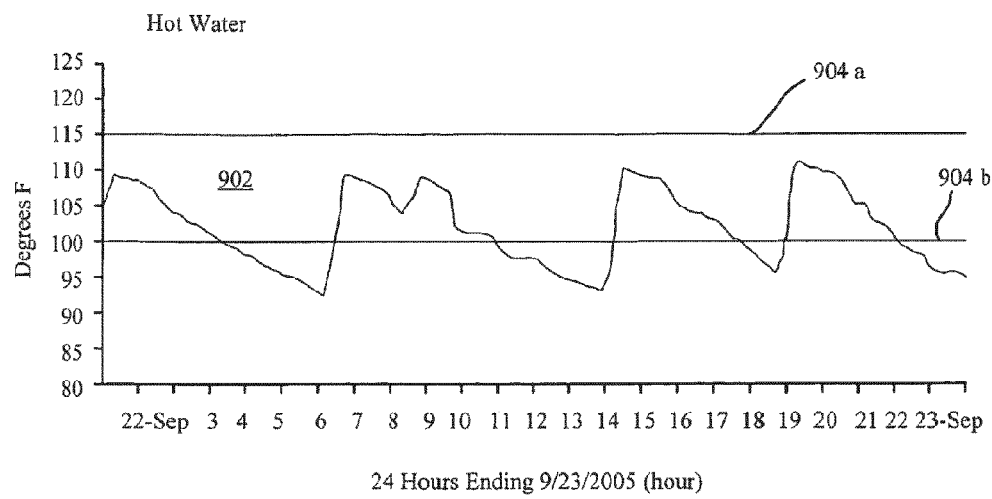
FIG. 9c and d illustrate example modes of operation provided by the present invention.
Figure 9D:
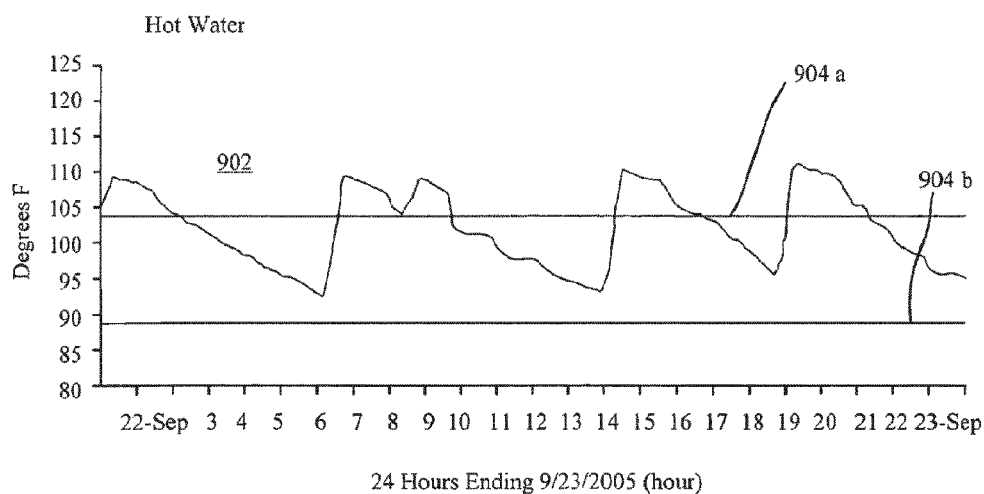

The present invention provides for modes of operating the appliances that is implemented by an operating band that is either shifted upward or downward based on the pricing signal. In other words, the invention can effect delaying a start and a premature stop of the appliance by moving the operating band with the pricing signal. FIGS. 9c and d illustrate examplary modes of operation, which include an inexpensive mode as shown in FIG. 9c and an expensive mode as shown in FIG. 9d. To explain, the inexpensive mode of operation of FIG. 9c indicates how the appliance should react during inexpensive pricing of electrical energy. Conversely, FIG. 9d indicates how the appliance should operate during expensive pricing of electrical energy. Of course, these figures are merely examples and any duty cycle and boundary conditions may be set.

More specifically with reference to FIG. 9c, the duty cycle schedule of FIG. 9a is again shown here, but this time with an operating band 902 overlayed on the duty cycle schedule. The operating band indicates a region where the appliance is in operation and includes an upper and lower limit 904a, b. The upper and lower limits may be set by the user or home owner of the appliance. The lower limit indicates the point at which the appliance is to switch on and the upper limit indicates when the appliance is to switch off. These may be set by the user in advance or preset through the Network (102, FIG. 1) for the various pricing situations. Of course, more than two modes of operation may be provided for with many different upper and lower limits.

During inexpensive pricing, the user may not mind spending money for energy and would be willing to pay for hotter water. Hence, the operation band boundary conditions are shifted upward. FIG. 9c shows that the operating band has a lower limit of 100 degrees F. and an upper limit of 115 degrees F. In other words, the appliance, in this case a hot water boiler, switches on when the internal water temperature falls below 100 degrees F. and switches off when it reaches 115 degrees F.

During expensive pricing, the user may indeed mind spending money for energy and would not be as willing to pay for hotter water. Hence, the operation band boundary conditions are shifted downward. FIG. 9d shows that the operating band has a lower limit of approx 90 degrees F. and an upper limit of 105 degrees F. In other words, the appliance, in this case a hot water boiler, switches on when the internal water temperature falls below 90 degrees F. and switches off when it reaches 105 degrees F.

To reiterate, the present invention in this implementation shifts demand by shifting the operating band of the appliance upward or downward according to the modes of operation by setting the pricing accordingly. It will be appreciated that the hot water boiler of FIGS. 9c and 9d are mere examples and that any appliance may include this feature. For example, the modified start/stop operating band can also be applied to refrigeration processes. For example, when energy is inexpensive, a fridge will adjust it's upper and lower limits to start prematurely (at a higher temperature) and stop after cooling to a lower than normal temperature.

The present invention can also use modes of operation to effectuate thermal energy storage. Thermal energy storage is achieved by automatically adjusting the upper and lower temperature limits of end uses such as space heating and cooling, heating hot water, and refrigeration. For example, by raising pricing, the invention causes hot water boiler appliances to shift the operating band lower, which causes the hot water boiler to wait until later to turn on. In other words, the present invention caused that hot water boiler to store thermal energy.

Figure 10:
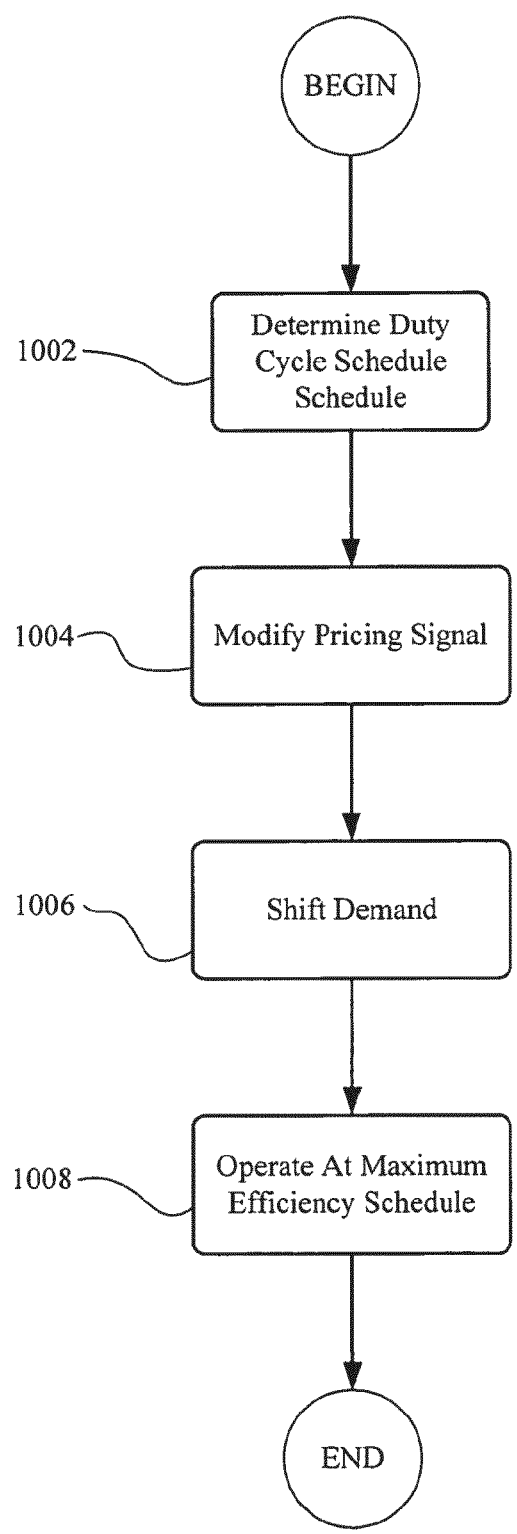
FIG. 10 illustrates the present invention in terms of a method.

FIG. 10 illustrates the method 1000 by which the example above carries out the invention. As discussed above, the invention in step 1002 determines a duty cycle schedule. As described, the duty cycle schedule is determined for a predetermined period of time that is sufficient in duration or length to provide a duty cycle schedule of a group of appliances that is predictable from time period to time period. In the next step 1004, the pricing signal, which is transmitted in real-time continuously of the period of time, is modified to encourage of discourage demand for power on the basis of an amount of currently available power and the duty cycle schedule. In step 1006, the demand for power is shifted to a time when the power generator(s) are brought on line and operated at a maximum efficiency as indicated in step 1008.

The orchestration of supply of power and demand for power may be controlled by a third entity, i.e., not the utilities and not the end users. The third entity may use, for example, a data management system, dynamic systems control and distributed operations equipment 112.

Turning now to another example, the orchestration of supply of power to demand for power of refrigerators will now be described.

As in the earlier example, a duty cycle schedule (step 1002, FIG. 10) for a typical refrigerator is similarly be determined for a period of time that provides a predictability about that demand and that includes information about the firing timing and power consumption of the appliance.

An aggregate demand is calculated according to Equation 3. One of the best estimates of the duty cycle for all properly working 'Energy Star' refrigerators is about 50%. Auto defrost models have a secondary duty cycle which amounts to about 10 minutes operation over a 18-36 hour period. This cycle draws a large amount of energy during that time, but compared to the compressor operation, impact on load is negligible.

The storage capacity of refrigerators is significant, especially in hot climates. For example, Florida's hot and humid climate challenges even the best refrigerators. Not surprisingly, refrigerators guzzle a lot of electricity in Florida (on average about 200 Watts each). With roughly 7 million refrigerators in the state of Florida, for example, the average, or aggregate, demand of these units exceeds 1 GW.

The aggregate demand is mapped or compared to the supply side curve and it is determined whether an instantaneous demand for power is capable of being met or whether output is at an efficient level. On this basis, it is determined to encourage or discourage demand in order to keep that demand where it is or shift it to a time when it is best matching to a maximum efficiency of output. The pricing signal is modified (step 1004, FIG. 10) to encourage or discourage the demand for power and the demand is shifted (step 1006, FIG. 10) to a time when the power generator(s) are operating at maximum efficiency (step 1008, FIG. 10).

The present invention also adjusts for the wastefulness of older technology. Over 25% of the refrigerators are old and inefficient—built before the advent of recent appliance efficiency standards. About 5% of them are replaced each year. Providing more efficiency from the supply side or from an intermediary infrastructure that orchestrates supply of power and demand for that power greatly cuts down on the wastefulness of those outdated refrigerators.

Again, it is important to note that at almost any time, an expensive or inexpensive price of electricity could have been sufficient incentive for refrigerators to delay or accelerate compressor operation by 10 or more minutes without having a noticeable impact on food temperature or longevity. In other words, the end user, particularly in the case of appliances with a high energy retention, does not notice the effect of the delay of the demand.

Here it is reiterated that the invention has a huge impact on environmentally harmful emissions. If 7 million Florida refrigerators produce an average demand of 1 GW and northern-climate refrigerators use less energy, it is estimated that the 110 million refrigerators in the United States produce an average demand of ~15 GW, or nearly 20% of the 73.9 GW worldwide electrical supply from wind power at the end of 2006. With the present invention, a renewable energy power source could be better integrated into that supply scheme, thereby reducing harmful emissions.

Advancements in refrigerator technology will yield two-speed or variable-speed 'always on' compressors that will be managed similarly. Refrigerators will be encouraged to shift from low to high-speed, or vice versa, based on real-time energy prices. In that case, such smart appliances are controlled directly on the bases of those real-time prices that are sent out continuously over the predetermined period of time.

It should also be considered that the foregoing examples are not limited to aggregating demand for one type of appliance but that one or more types of appliances may provide the aggregate demand. It is a matter only of determining the typical duty cycle schedule for the various types of appliances and using the Formula 3. Similarly, the supply of power may be provided by one or more of the power generators.

The examples provided were specific to electric utilities, though real-time control of demand is immediately applicable also to the transmission and distribution infrastructures of electric, gas and/or water utilities as well.

In conclusion of the exemplary description of the invention, the magnitude of demand that can be managed using real-time pricing according to the present invention is quantifiable and significant. Together, United States Residential Electric Hot Water Heaters and Refrigerators produce an average demand equivalent to approximately 40-45% of the worldwide electrical supply from wind power at the end of 2006. If even a fraction of the demand in the U.S. could be shifted to wind power sources, the present invention would have enormous benefit on the environment.

The opportunities to orchestrate supply and demand of power are very real. There are significant advantages in reducing burning of fossil-fuels, emissions of pollutants, and forestalling the building of new power plants. And there is the possibility that renewable resources such as Solar and Wind Power can search for and, essentially, create demand in real-time and hence be used more extensively and efficiently.

Although the present invention has immediate benefits to the environment, as technology expands into our everyday life the benefits of the present invention will further extend our energy resources and conserve our climate. In time, all of the infrastructure needed to fully maximize the benefit of the present invention will be in place. All of the technology is already there to implement in-building energy controllers, Internet Protocol interfaces for appliances, and sensible appliance control algorithms to react appropriately to real-time pricing signals. The details of that technology is not necessary for practice of the present invention.

Further, the present invention is not limited to affecting the demand side, but is in fact an orchestration of the supply of power with the demand for power. In other words, the invention is capable of being used well beyond utilities' price signals that are sent out in search of smart appliances. In a much more all-encompassing way, the DEMAND-SIDE (of homes and businesses in the future) is also able to search the SUPPLY-SIDE for lowest cost/most efficient alternatives to meet heating, cooling and electric energy needs.

This will automatically occur and flow directly from the implementation of the invention when power sources are developed not only to include distant utilities but nearby cogeneration power plants in the basement, the neighborhood or the family's hybrid car. The invention can then be used as before, treating those new sources of energy as any other type of power plant.

The concept of the 'Networked home' being 'plugged into the car' should be explored in the near future and it is anticipated that the invention will work just as meaningfully with those new sources of energy as with those of the 20$^{th}$ century. If occupants or appliances in a home or business need, say, heat and electricity, the cheapest source may a local resource (e.g., a car), a utility resource, or a combination of local and distant resources. The invention as described works also in this environment regardless of type of power source.

The invention claimed is:

1. A system that manages power consumption of an appliance, the system comprising:
   an interface configured to receive a pricing signal in real-time over a telecommunication network, the pricing signal indicating a price for power, the pricing signal being continually transmitted over the telecommunication network, and the interface configured to control the appliance coupled to the interface; and
   a utility configured to set the pricing signal to encourage demand of the power at a first time and to discourage demand of the power at a second time to maximize efficient operating levels of power output at both the first time and the second time;
   wherein the appliance has been set by a user to consume power at a predetermined point.

2. The system of claim 1, wherein the interface is further configured to report power usage information from a metering device or appliance on the demand side.

3. The system of claim 1, wherein the interface is further configured to set the appliance to operate in an expensive mode and an inexpensive mode, wherein the expensive mode turns the appliance off when the pricing signal indicates a price above a first threshold, and wherein the inexpensive mode turns the appliance on when the pricing signal indicates a price below a second threshold.

4. The system of claim 1, wherein the appliance is selected from the group consisting of a water boiler, a heater, an oven, a dishwasher, a refrigerator, lighting, air conditioning, and an electric or partially electric powered automobile.

5. The system of claim 1, wherein the appliance includes a processor for adjusting the power consumption of the associated appliance as controlled by the interface.

6. The system of claim 1, wherein the interface and appliance are connected to the telecommunication network selected from the group consisting of the internet, satellite, and home networking.

7. The system of claim 1, wherein the pricing signal is set for a limited time period on the basis of a storage capacity of a particular type of appliance.

8. The system of claim 1, wherein the pricing signal is set according to a budget of at least one consumer.

9. The system of claim 1, wherein the pricing signal is set for an aggregate of appliances of a plurality of consumers.

10. The system of claim 1, wherein the interface controls the appliance to pre-heat or pre-cool the consumer home or residence.

11. The system of claim 1, wherein the interface controls the appliance further on the basis of whether the appliance is a user activity independent appliance.

12. A method for managing power consumption of an appliance, the method comprising:
    receiving, by an interface, a pricing signal in real-time over a telecommunication network, the pricing signal indicating a price for power, the pricing signal being continually transmitted over the telecommunication network; and
    receiving, by the interface, a setting for the appliance to consume power at a predetermined point; and
    controlling, by the interface, the appliance based on the pricing signal, the appliance being coupled to the interface;
    setting, by a utility, the pricing signal to encourage demand of the power at a first time and to discourage demand of the power at a second time to maximize efficient operating levels of power output at both the first time and the second time.

13. The method of claim 12, further comprising the step of reporting, by the interface through the telecommunication network, power usage information for the appliance.

14. The method of claim 12, further comprising the step of setting the appliance to operate in an expensive mode and an inexpensive mode, wherein the expensive mode turns the appliance off when the pricing signal indicates a price above a first threshold, and wherein the inexpensive mode turns the appliance on when the pricing signal indicates a price below a second threshold.

15. The method of claim 12, further comprising the step of setting the pricing signal according to a budget of at least one consumer.

16. The method of claim 12, wherein the pricing signal is set for an aggregate of appliances of a plurality of consumers.

* * * * *